US006714946B1

(12) United States Patent
Kanai et al.

(10) Patent No.: US 6,714,946 B1
(45) Date of Patent: Mar. 30, 2004

(54) DATA MANAGEMENT SYSTEM USING A PLURALITY OF DATA OPERATING MODULES

(75) Inventors: Tatsunori Kanai, Kanagawa (JP); Toshiki Kizu, Kanagawa (JP); Seiji Maeda, Kanagawa (JP); Hiroshi Yao, Kanagawa (JP); Osamu Torii, Kanagawa (JP); Hirokuni Yano, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 244 days.

(21) Appl. No.: 09/666,128

(22) Filed: Sep. 20, 2000

(30) Foreign Application Priority Data

Sep. 30, 1999 (JP) ........................................ P11-278261

(51) Int. Cl.[7] ................................................ G06F 17/30

(52) U.S. Cl. ................... 707/104.1; 707/10; 707/103 Y

(58) Field of Search ............................... 707/10, 103 Y, 707/104.1, 200, 217, 238, 311; 709/206, 238; 345/708; 711/5

(56) References Cited

U.S. PATENT DOCUMENTS

| | | | | |
|---|---|---|---|---|
| 5,261,080 A | | 11/1993 | Khoyi et al. | 710/65 |
| 5,581,797 A | * | 12/1996 | Baker et al. | 345/708 |
| 5,727,158 A | | 3/1998 | Bouziane et al. | 709/225 |
| 6,167,564 A | * | 12/2000 | Fontana et al. | 717/104 |

OTHER PUBLICATIONS

Benny Goodheart, et al., "The Magic Garden Explained", The Internals of UNIX System V Release 4, Chapter 7, "STREAMS"; 1999 (Prentice Hall, ISBNO–13–098138–9), pp. 403–527.

REC–DOM–Level–1–19981001, "Document Object Model (DOM) Level 1 Specification", Version 1.0, W3C Recommendation, Oct. 1, 1998, pp. 1–169.

Y. Goland, et al., HTTP Extensions for Distributed Authoring—WEBDAV, Network Working Group Request for Comments: 2518, Category: Standards Track, Feb. 1999, pp. 1–71.

W3C REC–xml–19980210, Extensible Markup Language (XML) 1.0, W3C Recommendation, Feb. 10, 1998, pp. 1–32.

* cited by examiner

*Primary Examiner*—Diane D. Mizrahi
(74) *Attorney, Agent, or Firm*—Oblon, Spivak, McClelland, Maier & Neustadt, P.C.

(57) ABSTRACT

A data management system capable of realizing improved flexibility, independency and expandability together is disclosed. The data management system is formed by a memory unit configured to store a plurality of data operation modules for operating data which have different operation functions, and an operation unit configured to read out data requested by the application program from the data storage system, select those data operation modules that should carry out the operations with respect to the data such that the data will be in compliance with a data model suitable for the processing that the application program wishes to carry out, from the plurality of data operation modules, such that the data to which the operations are applied by selected data operation modules are given to the application program.

11 Claims, 22 Drawing Sheets

FIG.5

| DATA OPERATION MODULE NAME | POINTER TO DATA OPERATION MODULE MANAGER |
|---|---|
| <propm/> | POINTER TO PROPERTY MODULE MANAGER |
| <dirm/> | POINTER TO DIRECTORY MODULE MANAGER |
| <kvm/> | POINTER TO Key-Value MODULE MANAGER |
| <xmlm/> | POINTER TO XML MODULE MANAGER |
| <fsm/> | POINTER TO FILE SYSTEM MODULE MANAGER |

FIG.6

| NAME | POINTER TO PROPERTY MODULE | POINTER TO DIRECTORY MODULE |
|---|---|---|
| /dir1 | | |
| /dir1/dir2 | | |
| /dir1/dir2/data1 | | |
| /dir1/dir3 | | |
| /dir1/dir2/data3 | | |
| ⋮ | ⋮ | ⋮ |

FIG.7
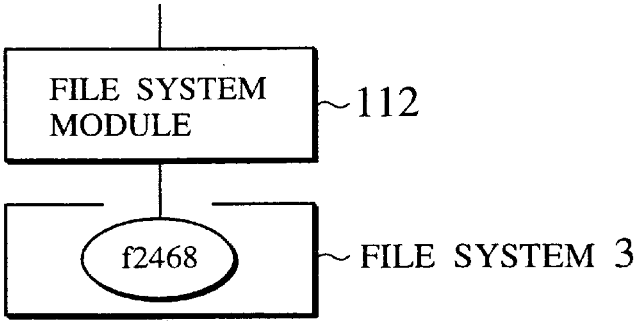
FIG.8
```
<fsm>
    <file>
        <name>f2468</name>
    </file>
</fsm>
```
FIG.9
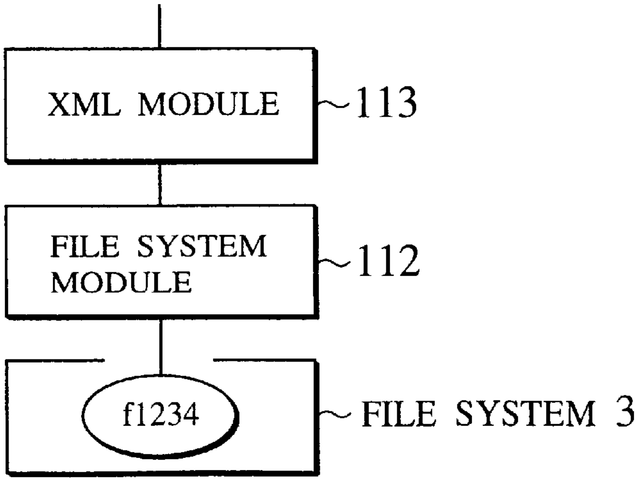

FIG.10

```
<xmlm>
    <fsm>
        <file>
            <name>f1234</name>
        </file>
    </fsm>
</xmlm>
```

FIG.11

```
<kvtable>
    <entry>
        <key>OSAKA</key>
        <value>TAKOYAKI</value>
    </entry>
    <entry>
        <key>HAKATA</key>
        <value>KARASHIMENTAIKO</value>
    </entry>
        .
        .
        .
</kvtable>
```

```
<kvm>
    <xmlm>
        <fsm>
            <file>
                <name>f7281</name>
            </file>
        </fsm>
    </xmlm>
</kvm>
```

FIG. 14

```
<kvtable>
   <entry>
        <key>creationdate</key>
        <value>1999-08-21/14:32:51.012345</value>
   </entry>
   <entry>
        <key>owner</key>
        <value>John</value>
   </entry>
   <entry>
        <key>module</key>
        <value>
              <xmlm>
                   <fsm>
                        <file>
                             <name>f3617</name>
                        </file>
                   </fsm>
              </xmlm>
        </value>
   </entry>
      .
      .
      .
</kvtable>
```

```
<propm>
    <kvm>
        <xmlm>
            <fsm>
                <file>
                    <name>f9001</name>
                </file>
            </fsm>
        </xmlm>
    </kvm>
</propm>
```

FIG.17

```
<kvtable>
    <entry>
        <key>data1</key>
        <value>
            <propm>
                <kvm>
                    <xmlm>
                        <fsm>
                            <file>
                                <name>f9001</name>
                            </file>
                        </fsm>
                    </xmlm>
                </kvm>
            </propm>
        </value>
    </entry>
    <entry>
        <key>data2</key>
        <value>
            <propm>
                <kvm>
                    <xmlm>
                        <fsm>
                            <file>
                                <name>f6421</name>
                            </file>
                        </fsm>
                    </xmlm>
                </kvm>
            </propm>
        </value>
    </entry>
</kvtable>
```

```
<dirm>
    <kvm>
        <xmlm>
            <fsm>
                <file>
                    <name>f8001</name>
                </file>
            </fsm>
        </xmlm>
    </kvm>
</dirm>
```

FIG.21

```
<rule>
    <category> <property/> </category>
    <expand> <propm/> </expand>
</rule>

<rule>
    <category> <directory/> </category>
    <expand> <dirm/> </expand>
</rule>

<rule>
    <category> <association/> </category>
    <expand> <kvm/> </expand>
</rule>

<rule>
    <category> <document/> </category>
    <expand> <xmlm/> </expand>
</rule>

<rule>
    <category> <binary/> </category>
    <expand> <fsm/> </expand>
</rule>

<rule>
    <category> <file/> </category>
    <expand> <file/> </expand>
</rule>
```

FIG.22

```
<rule>
    <category> <file/> </category>
    <expand>
            <file>
                <partition>1</partition>
            </file>
    </expand>
</rule>
```

```
<rule>
    <category> <document/> </category>
    <context>
        <not> <dtdm/> </not>
    </context>
    <expand> <dtdm/> </expand>
</rule>
```

RULE OF dir1

```
<rule>
    <category> <file/> </category>
    <expand>
        <file>
            <partition>0</partition>
        </file>
    </expand>
</rule>
```

RULE OF dir2

```
<rule>
    <category> <file/> </category>
    <expand>
        <file>
            <partition>1</partition>
        </file>
    </expand>
</rule>
```

FIG.28A
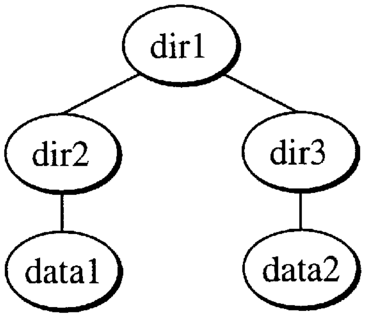
FIG.28B
RULE OF dir1
```
<rule>
    <category> <document/> </category>
    <expand> <xmls/> </expand>
</rule>
```
FIG.28C
RULE OF dir2
```
<rule>
    <category> <document/> </category>
    <expand> <xmlr/> </expand>
</rule>
```
FIG.28D
MODULE HIERARCHY OF data1
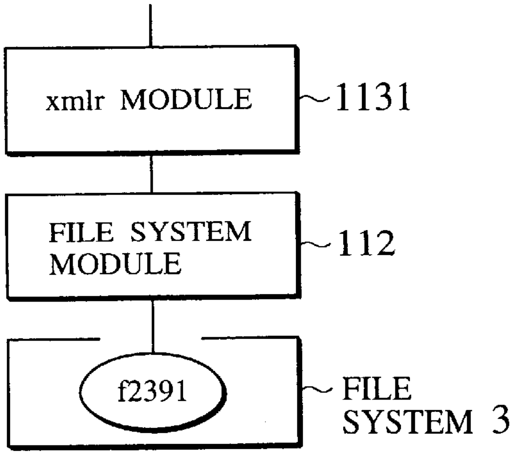
FIG.28E
MODULE HIERARCHY OF data2
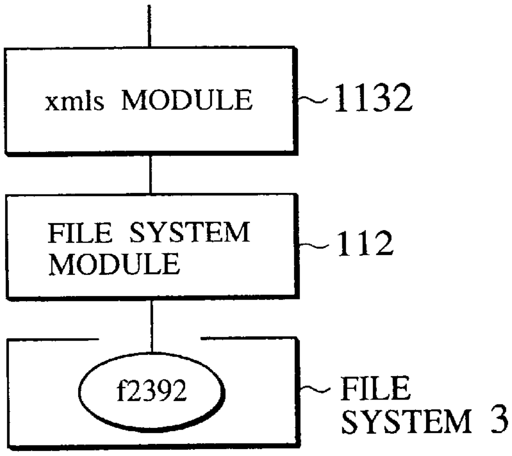

FIG.30

```
<kva>
    <kvainfo>
        <data>
            <xmlm>
                <fsm>
                    <file>
                        <name>f6486</name>
                    </file>
                </fsm>
            </xmlm>
        </data>
        <index>
                <fsm>
                    <file>
                        <name>f6486</name>
                    </file>
                </fsm>
        </index>
    <kvainfo>
</kva>
```

DATA MANAGEMENT SYSTEM USING A PLURALITY OF DATA OPERATING MODULES

BACKGROUND OF THE INVENTION

Field of the Invention

The present invention relates to a data management system and a data management method for providing data management and operation functions in a computer.

DESCRIPTION OF THE BACKGROUND ART

Data to be handled in a computer are usually managed by using a file system or a database management system.

The file system manages very basic data called byte sequences by attaching names to them. The data of the byte sequences managed by the file systems are called files. The application program can carry out basic operations for writing new data into files or reading already written data from files.

Thus the file system provides a data model called byte sequences which are both basic and flexible. However, the byte sequences is a data model that is conceptually at very low level, so that it is necessary for the application program to define and use data management structure and operations unique to that application program on the byte sequences in order to use this data model for solving various problems actually encountered in the computer. For this reason, the data independency is low and it is difficult to share data among a plurality of application programs.

On the other hand, the database management system provides more sophisticated functions specific to a specific data model by presupposing the use of the specific data model. The most widely used database management system is the relational database management system based on the relational data model. The relational database management system manages all data by expressing them on tables, and provides functions for searching data stored in the table by specifying a key, or searching related data in a plurality of tables using an operation called JOIN. The application program can carry out the processing using various operation functions provided by the relational database management system if the necessary data can be defined in forms of tables. There are also database management systems using data models other than the relational data model such as the network data model and the object data model.

In the case of managing data by using the database management system, the data management and operation are separated from the application program and carried out at the database management system side. Namely, the independency of data can be realized so that it becomes easier to utilize one data by sharing it among a plurality of application programs. In addition, the database management system provides functions such as the management of consistency required for the transaction processing, the exclusive control in the case of processing by sharing data among a plurality of application programs, and the recovery processing at a time of a fault occurrence.

Thus the database management system provides various management and operation functions by specifying the specific data model which is conceptually at high level, so that the data independency is high and it is easy to share data among a plurality of application programs. However, although an application program that matches with the data model provided by the database management system can be designed easily and a high performance can be achieved easily, an application program that does not match the data model is difficult to design and it is hard to achieve a high performance. From a viewpoint of the flexibility of data, the available degrees of freedom are limited compared with the file system, and the expandability of the management and operation functions for new data or data model is also poor.

SUMMARY OF THE INVENTION

It is therefore an object of the present invention to provide a data management system and a data management method capable of realizing improved flexibility, independency and expandability together.

According to one aspect of the present invention there is provided a data management system for applying operations on data outputted from a data storage system and providing data to a processing of an application program, the data management system comprising: a memory unit configured to store a plurality of data operation modules for operating data which have different operation contents; and an operation unit configured to read out data requested by the application program from the data storage system, select those data operation modules that should carry out the operations with respect to the data such that the data will be in compliance with a data model suitable for the processing that the application program wishes to carry out, from the plurality of data operation modules, such that the data to which the operations are applied by selected data operation modules are given to the application program.

According to another aspect of the present invention there is provided a data management method in a data management system for applying operations on data outputted from a data storage system and providing data to a processing of an application program, the data management method comprising the steps of: reading out data requested by the application program from the data storage system upon receiving a request for processing with respect to a desired data stored in the data storage system from the application program; selecting those data operation modules that should carry out the operations with respect to the data such that the data will be in compliance with a data model suitable for the processing that the application program wishes to carry out, from a plurality of data operation modules for operating data which have different operation contents, that are provided in advance; applying the operations to the data by selected data operation modules and giving the data to which the operations are applied by the selected data operation modules to the application program.

According to another aspect of the present invention there is provided a computer usable medium having computer readable program codes embodied therein for causing a computer to function as a data management system for applying operations on data outputted from a data storage system and providing data to a processing of an application program, the computer readable program codes include: a first computer readable program code for causing said computer to read out data requested by the application program from the data storage system upon receiving a request for processing with respect to a desired data stored in the data storage system from the application program; a second computer readable program code for causing said computer to select those data operation modules that should carry out the operations with respect to the data such that the data will be in compliance with a data model suitable for the processing that the application program wishes to carry out, from a plurality of data operation modules for operating data which have different operation contents, that are provided in advance; and a third computer readable program code for causing said computer to apply the operations to the data by selected data operation modules and giving the data to which the operations are applied by the selected data operation modules to the application program.

Other features and advantages of the present invention will become apparent from the following description taken in conjunction with the accompanying drawings.

BRIEF DESCRIPTION OF THE DRAWINGS

FIG. 5 is a diagram showing an example of a data operation module management table used in the data management system of FIG. 3 and FIG. 4.

FIG. 6 is a diagram showing an example of a name management table used in the data management system of FIG. 3 and FIG. 4.

FIG. 7 is a diagram showing an exemplary manner of using a file system module in the data management system of FIG. 3 and FIG. 4.

FIG. 8 is a diagram showing an exemplary description describing a manner of using a file system module in the data management system of FIG. 3 and FIG. 4.

FIG. 9 is a diagram showing an exemplary manner of using an XML module in the data management system of FIG. 3 and FIG. 4.

FIG. 10 is a diagram showing an exemplary description describing a manner of using an XML module in the data management system of FIG. 3 and FIG. 4.

FIG. 11 is a diagram showing an exemplary management format for managing pairs of a key and a value as XML documents by a Key-Value module in the data management system of FIG. 3 and FIG. 4.

FIG. 14 is a diagram showing an exemplary management format for managing properties by a Key-Value module in the data management system of FIG. 3 and FIG. 4.

FIG. 17 is a diagram showing an exemplary management format for managing directories by a Key-Value module in the data management system of FIG. 3 and FIG. 4.

FIG. 21 is a diagram showing exemplary rules indicating correspondences between categories and data operation modules that can be used in the data management system of FIG. 3 and FIG. 4.

FIG. 22 is a diagram showing an exemplary rule for <file/> that can be used in the data management system of FIG. 3 and FIG. 4.

FIGS. 28A, 28B, 28C, 28D and 28E are diagrams showing another example of a structure of directories and data, two rules for two directories, and two module hierarchies for two data that can be used in the data management system of FIG. 3 and FIG. 4.

FIG. 30 is a diagram showing an exemplary description describing a manner of using an expanded Key-Value module in the data management system of FIG. 3 and FIG. 4.

DETAILED DESCRIPTION OF THE PREFERRED EMBODIMENTS

Referring now to FIG. 1 to FIG. 30, one embodiment of a data management system according to the present invention will be described in detail.

In this embodiment, the exemplary case of managing data in a hierarchical name space by attaching properties to data in the data management system will be described.

For such a data management method, it is possible to use WebDAV, but the present invention is not limited to that case. The specification of WebDAV is disclosed in "HTTP Extensions for Distributed Authoring—WEBDAV" (RFC 2518).

In the data management system of this embodiment, in order to manage data by attaching hierarchical names, a hierarchical structure of names is managed by directories. Namely, the directory can have arbitrary number of other directories and data at its lower hierarchical levels. For example, in an example of the hierarchical structure shown in FIG. 1, three data "data1", "data2" and "data3" and three directories "dir1", "dir2" and "dir3" are shown, where three data are managed by names such as "/dir1/dir2/data1", "/dir1/dir2/data2" and "/dir1/dir3/data3". Note that, in the WebDAV, data and directories are referred to as resources, and directories are also referred to as collections.

The data managed by the data management system of this embodiment can be any of binary data as in the file system, structured data such as XML documents, and database-like data to be accessed by specifying a value of a key. Besides these it is also possible to manage data based on various extended data models. Details of XML are disclosed in "Extensible Markup Language (XML) 1.0" (World Wide Web Consortium).

Figure 1:
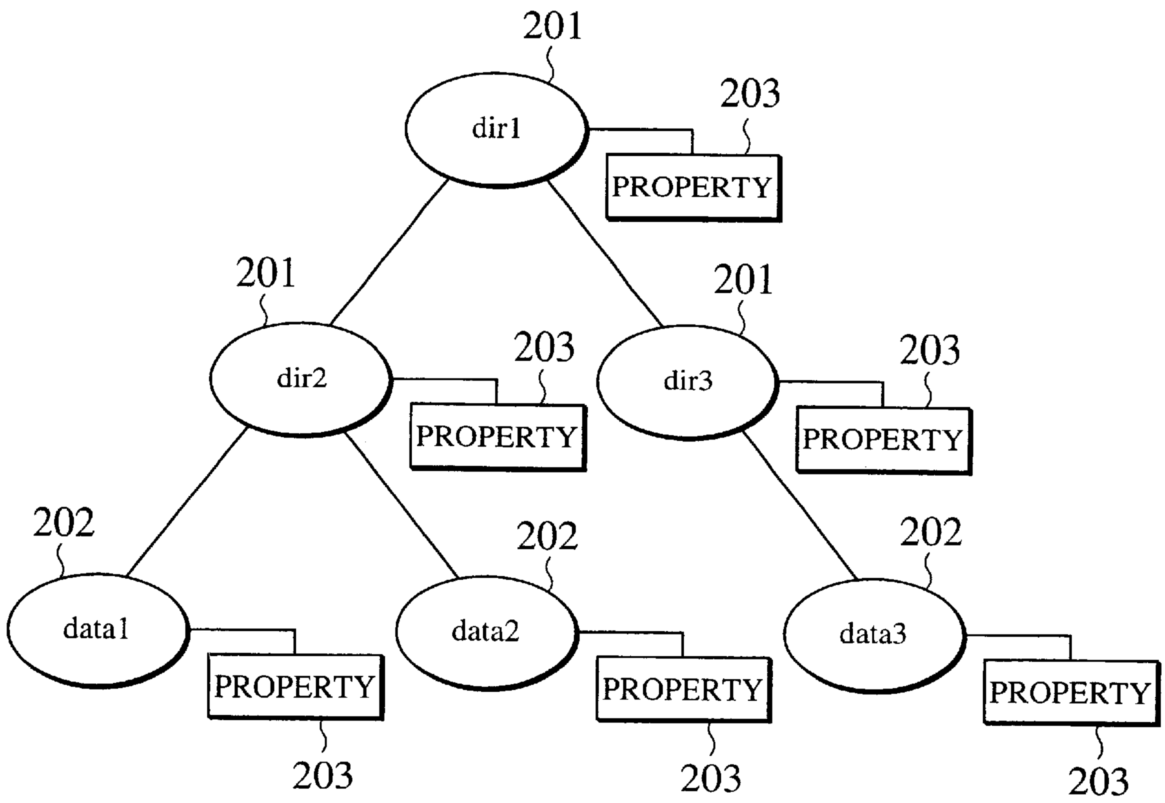
FIG. 1 is a diagram showing an exemplary structure of data to be managed by the data management system according to the present invention.

As shown in FIG. 1, each directory (201) or data (202) has a property (203) which is a set of a pair formed by an attribute name and an attribute value. The property is used for recording various information such as its directory, a file creation date, access rights, an owner, etc.

Figure 2:
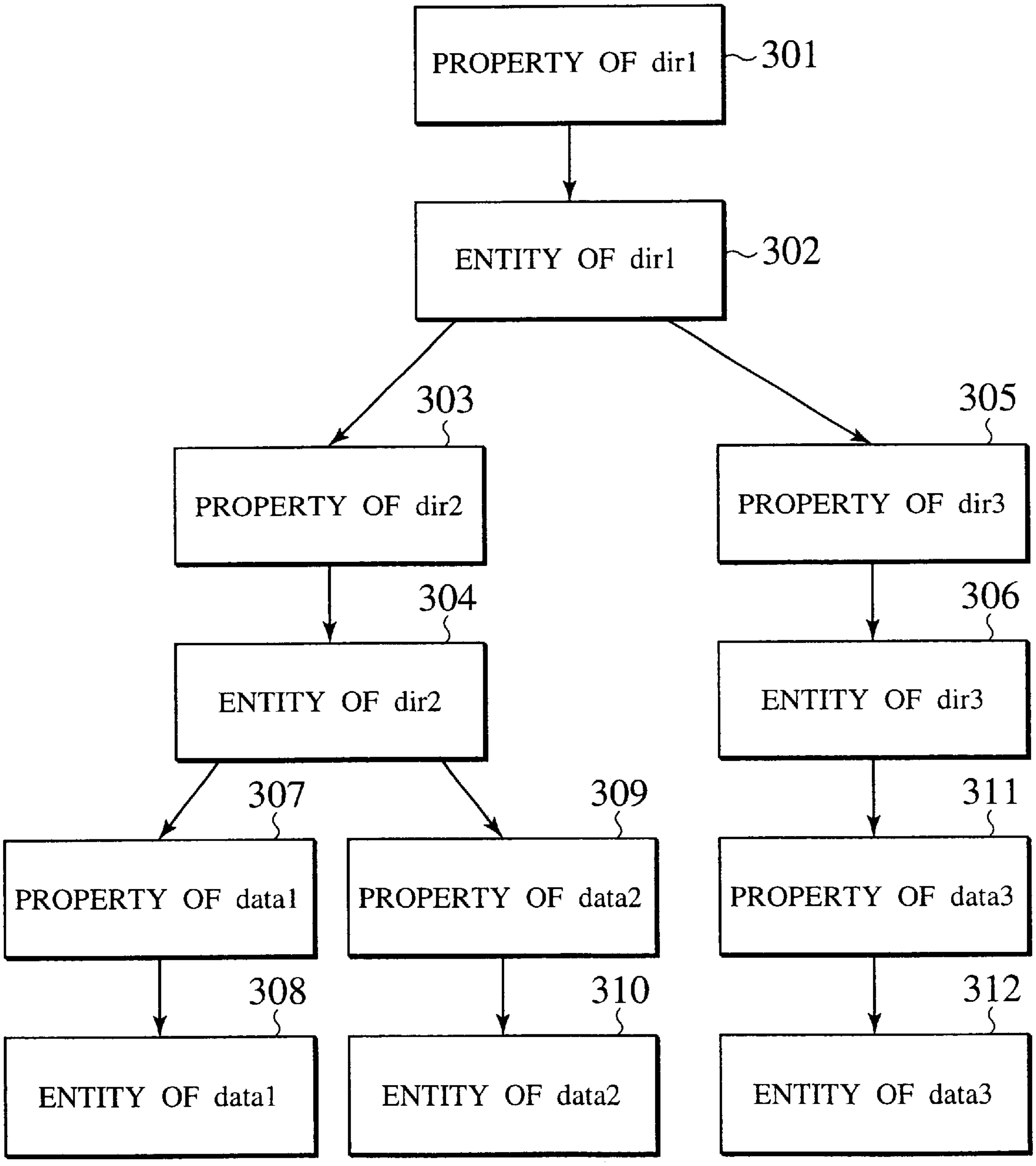
FIG. 2 is a diagram showing an exemplary relationships between properties and data entities for the data shown in FIG. 1.

In the data management system of this embodiment, the directories and properties are also managed as data. For example, the data management structure in the example of FIG. 1 can be viewed as shown in FIG. 2 from a viewpoint of the implementation, where data that are entities of the directories (302 and 304, for example) have information indicating properties of their children directories or data (303 and 307, for example), and data of properties (303 and 307, for example) have information indicating entities of the corresponding directories or data (304 and 308, for example). In other words, it can be said that the data model expressing directories and the data model expressing properties are provided.

Figure 3:
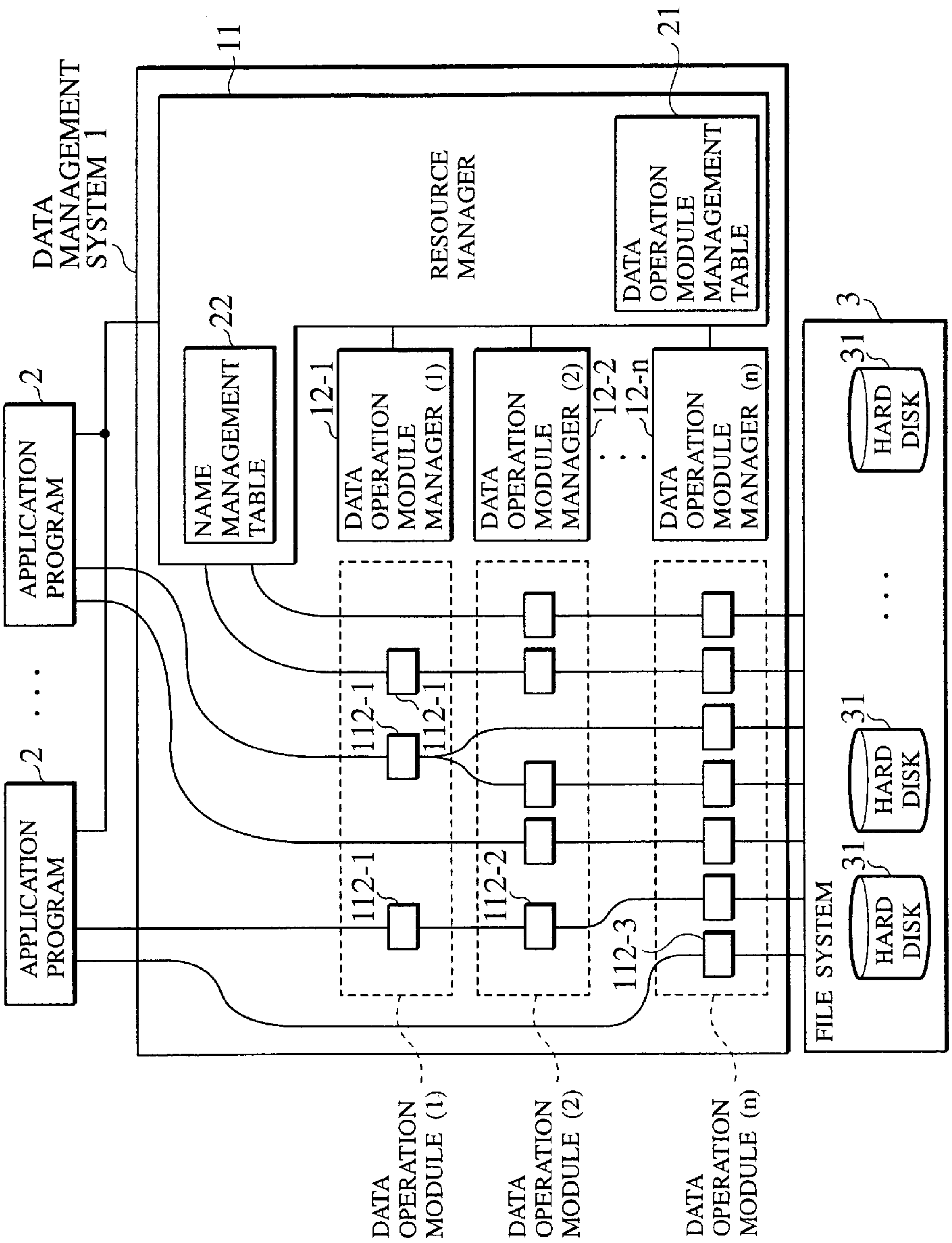
FIG. 3 is a block diagram showing a general exemplary configuration of the data management system according to one embodiment of the present invention.

FIG. 3 shows a general exemplary configuration of the data management system according to this embodiment.

Note that, in this embodiment, the case of using the file system as a data storage system will be described. In FIG. 3, the file system 3 manages files in the stable memory devices such as hard disks 31, for example. Here, the stable memory device is a memory device such as hard disk, for example, in which the stored content will not disappear even when the power is turned off.

In short, the data management system 1 carries out file operations for managing the file system 3 upon receiving requests from the application programs 2. For example, the data model conversion (conversion from the binary data recorded in the file to XML, for example) for data in the file system 3 and the operation functions in some data model are provided with respect to the application programs 2.

As shown in FIG. 3, the data management system 1 comprises three types of constituent elements, including a resource manager 11, n types of data operation module managers 12-1 to 12-n, where n is an integer greater than or equal to 1, and n types of data operation modules 112-i corresponding to the data operation module managers 12-i (i=1 to n).

Note that, in FIG. 3, rectangles depicted inside each dashed line enclosure represent the data operation modules of the identical function (this also applies to FIG. 4 described below). For example, in FIG. 3, three rectangles depicted inside a dashed line enclosure corresponding to the first data operation module manager 12-1 all represent the data operation modules 112-1 of the identical function (this also applies similarly to the other data operation modules 112-2 and 112-3.)

The data operation module 112-i provides some data management and operation functions with respect to its user (the application program 2 or the resource manager 11). For example, as will be described below, a function for enabling management and operation of binary files as XML documents or an associative memory function using a pair of a key and a value on the XML documents is provided. Namely, the role of the data operation module is to make the lower level data or data models appear as other types of data or data models, and provide management and operation functions with respect to these other types of data or data models at the same time.

In the data management system 1 of this embodiment, a set of one or more data operation modules 112-i provide management and operation functions for one data, with respect to the application program 2 or the resource manager 11. Namely, in the case where the application program 2 or the resource manager 11 carries out the processing with respect to data, directories and properties in the file system 3 by utilizing the data management system 1, one or more data operation modules 112-i are used in combination according to the data model, the operation content, etc., as in an exemplary case shown in FIG. 3.

Note that, in this embodiment, the exemplary case of using hierarchically combined data operation modules ranging from the lowest level data operation module up to a hierarchical level according to a request of the application program 2 or the like, as shown in FIGS. 7, 9, 12, 15, 18, 25 and 28.

Also, an entity of the data operation module 112-i exists for each operation target data. Consequently, when a plurality of operation entities (the application programs 2 or the resource manager 11) are operated simultaneously, in practice there can be cases where a plurality of data operation modules 112-i of the identical function are existing (or used) simultaneously as in the exemplary case shown in FIG. 3, cases where only one data operation module 112-i is existing (or used), and cases where no data operation module 112-i is existing (or used).

The data operation modules 112-i of the identical function are managed by the corresponding one data operation module manager 12-i. As described above, data operation modules 112-i to be managed by each data operation module manager 12-i may be plural, one or none. In the example of FIG. 3, the data operation module manager (1) is managing three data operation modules (1), the data operation module manager (2) is managing five data operation modules (2), and the data operation module manager (n) is managing seven data operation modules (n).

Also, in this embodiment, a relationship between the data operation module manager 12-i and the data operation modules 112-i is equivalent to a relationship between a class and instances in the object-oriented programming language. In the case of actually realizing the data operation module manager 12-i and the data operation modules 112-i in the object-oriented manner, the data operation module manager 12-i alone is to be programmed, and the data operation modules 112-i can be created or deleted according to the need during the operation.

The resource manager 11 has a function for making a set up to enable a desired operation by combining necessary data operation modules 112-i upon receiving a data operation request from the application program 2. The resource manager 11 has a name management table 22 for managing correspondences between names of currently used data and the data operation modules, and a data operation module management table 21 to be used at a time of combining the data operation modules.

Next, this data management system will be described in further detail.

Figure 4:
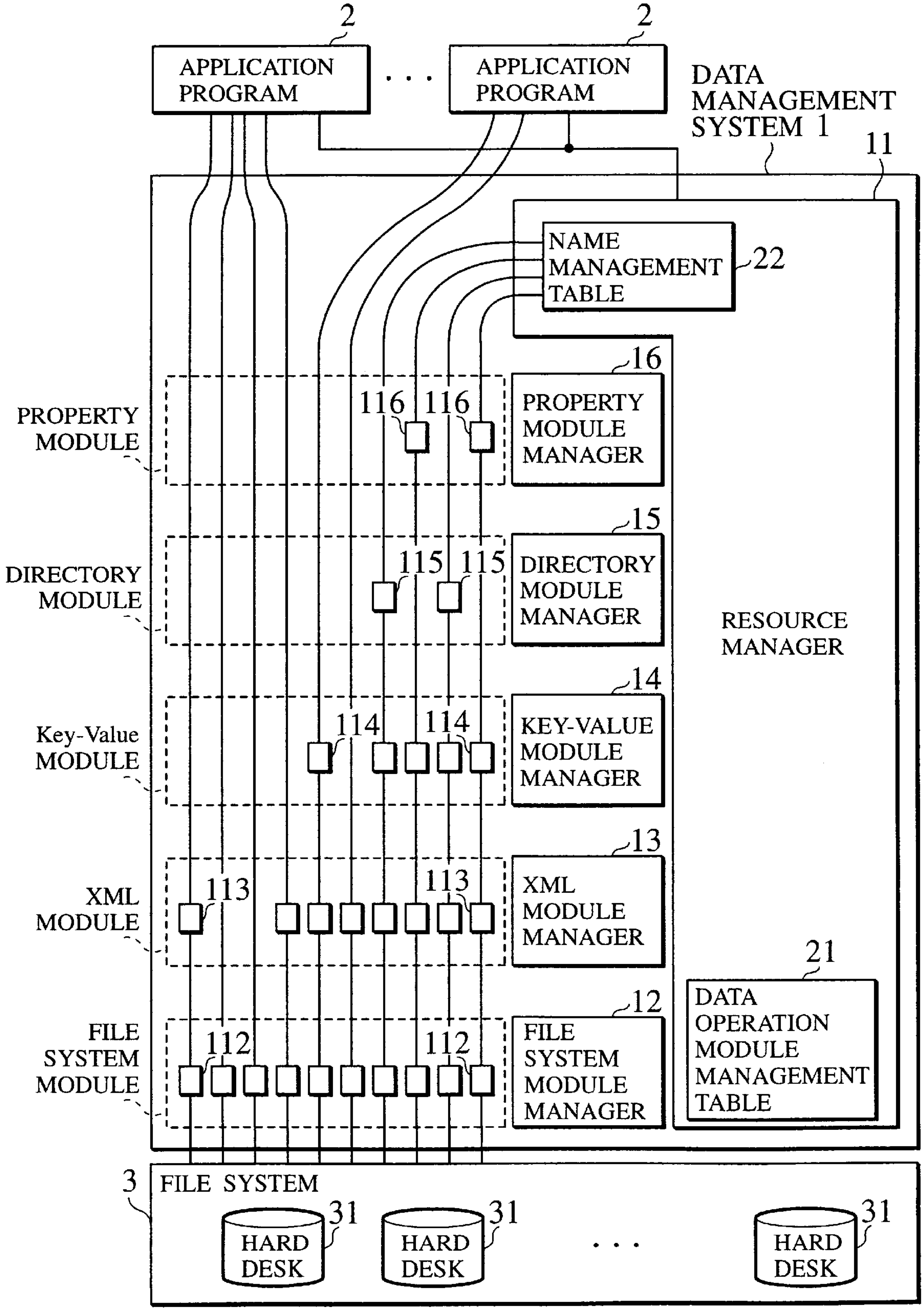
FIG. 4 is a block diagram showing a more specific exemplary configuration of the data management system according to one embodiment of the present invention.

FIG. 4 shows a more specific exemplary configuration of this data management system.

This data management system 1 has five types of data operation module managers including a file system module manager 12, an XML module manager 13, a Key-Value module manager 14, a directory module manager 15 and a property module manager 16. Also, in correspondence to them, five types of data operation modules 112–116 will be used according to the need. Note that the state of existence (the state of utilization) of the data operation modules shown in FIG. 4 represents only an example at some moment, and will be changed according to the data operation state by the data operation subject. Also, in FIG. 4, the reference numerals 112–114 for the corresponding modules are partially omitted for the sake of simplicity.

FIG. 5 shows an exemplary structure of the data operation module management table 21 in the resource manager 11.

The data operation module management table 21 records a correspondence between a name of each data operation module and a pointer to the data operation module manager that manages that data operation module.

In the example of FIG. 5, the names of the data operation module is specified by the XML elements such as <Propm/> and <xmlm/>. These names of the data operation modules will be used in describing "a manner of combination" of the data operation modules necessary in accessing respective data.

FIG. 6 shows an exemplary structure of the name management table 22 managed by the resource manager 11.

The name management table 22 records a correspondence among a name of each currently used directory or data, a pointer to a property module for its property, and a pointer to a directory module for its directory in the case of the directory. Note that, as will be described below, the property module 116 is a data operation module expressing the property, and the directory module 115 is a data operation module expressing the directory.

In the example of FIG. 6, the names are given by "/dir1", "/dir1/dir2/data1", etc. Also, in FIG. 6, the column for a pointer to the property module and a column for a pointer to the directory module are depicted as empty, but appropriate pointers to the property modules and pointers to the directory modules will be entered in these columns in practice.

In the following, the functions of the data operation modules in the exemplary configuration of FIG. 4 will be described.

The first data operation module is the file system module.

The file system module 112 is a data operation module which has a role of abstracting the file system 3 provided below the data management system 1. Its main function is to provide read/write operations with respect to binary data recorded in the file system 3.

Examples of the operations to be provided by the file system module 112 with respect to binary data include the following.

(1) READ: Read out data of a specified length starting from a specified offset.

(2) WRITE: Write data of a specified length starting from a specified offset.

In the case of accessing binary data by using the file system module 112, usually the file system module 112 alone is used as shown in FIG. 7. In this example, the content of a file with a name "f2468" that is recorded in the lower level file system 3 is exhibited to the upper level application program 2 as binary data.

In the case of accessing binary data as in FIG. 7, "a manner of combination of the data operation modules" will be described as shown in FIG. 8, for example. Here, an element <fsm> that represents the file system module is followed by an element <file> which has the management information in the lower file system 3, and then by <name>f2468</name> indicating the actual management name.

In such "a manner of combination of the data operation module" is managed by the resource manager 11 by describing it in the entity of the property or the directory of the corresponding data.

The second data operation module is the XML module.

The XML module 113 stores a tree structure data for the XML documents in an internal representation, on binary data provided by the file system module 112 provided below this XML module 113, and enables operations with respect to the tree structure data, such as reading of a document in the tree structure and addition/deletion of a partial tree.

At this point, it is possible to use a DOM interface disclosed in "Document Object Model (DOM) Level 1 Specification" (World Wide Web Consortium), for example, as an interface for operating the tree structure data of the XML documents. It is also possible to use the other original interface if desired.

Examples of the operations to be provided by the XML module 113 with respect to XML documents include the following.

(1) CHILD: Extract the first child element or text.

(2) NEXT: Extract a next element or text which has the same parent.

(3) PREV: Extract a previous element or text which has the same parent.

(4) PARENT: Extract a parent element.

(5) REMOVE: Remove a specified element or text.

(6) ADDFIRST: Add a new element or text as the first child.

(7) ADDLAST: Add a new element or text as the last child.

In the case of accessing data of the XML document by using the XML module 113, usually the XML module 113 and the file system module 112 are used in combination as shown in FIG. 9.

At this point, "a manner of combination of the data operation modules" will be described as shown in FIG. 10, for example. Here, an element <xmlm> that represents the XML module is followed by information of the file system module that is provided below this XML module.

The third data operation module is the Key-Value module.

The Key-Value module 114 is a data operation module for storing a plurality of pairs of a key and a value, and enabling associative access by specifying a key with respect to the stored set of pairs of a key and a value. In this embodiment, the Key-Value module 114 stores the set of pairs of a key and a value in forms of XML documents. Consequently, the Key-Value module 114 provides an associative memory function on XML documents provided by the XML module 113.

Examples of the operations to be provided by the Key-Value module 114 include the following.

(1) FIND: Extract a value of a specified key.

(2) ADD: Register a specified pair of a key and a value.

(3) REMOVE: Remove a pair of a specified key and a value associated with that key.

The Key-Value module 114 manages the set of pairs of a key and a value as XML documents in a format as shown in FIG. 11. In FIG. 11, each <entry> element has one pair of a key and a value, each <key> element has a key, and each <value> element has a value. This example records a state in which a key "OSAKA" has a value "TAKOYAKI", and a key "HAKATA" has a value "KARASHIMENTAIKO".

In the example of FIG. 11, the pairs of a key and a value are managed by arranging them serially, but it is also possible to use an implementation for enabling faster search by using the well known data structure such as binary tree or B-TREE. One of the features of the present invention is that such an internal implementation of the Key-Value module 114 can be changed without affecting the other data operation modules and the application program 2 that uses the Key-Value module 114.

Figures 12, 13:
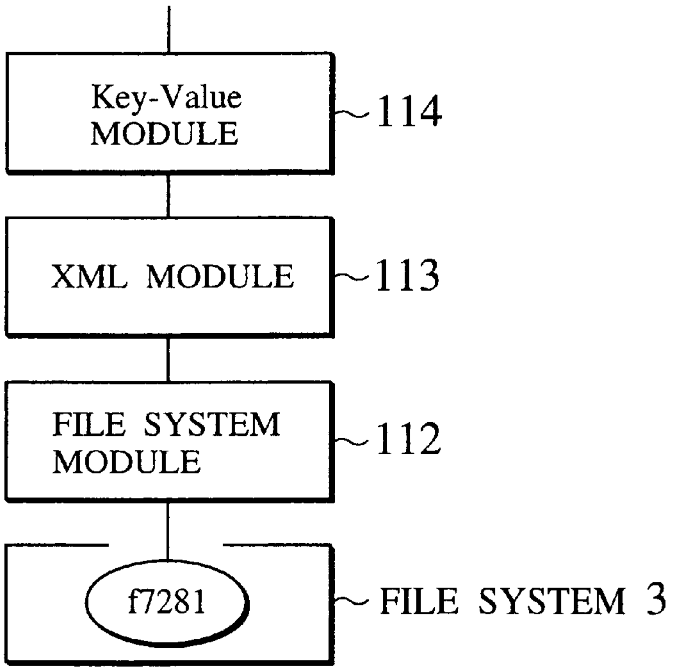
FIG. 12 is a diagram showing an exemplary manner of using a Key-Value module in the data management system of FIG. 3 and FIG. 4.
FIG. 13 is a diagram showing an exemplary description describing a manner of using a Key-Value module in the data management system of FIG. 3 and FIG. 4.

In the case of accessing data by using the Key-Value module 114, usually the Key-Value module 114, the XML module 113 and the file system module 112 are used in combination as shown in FIG. 12.

At this point, "a manner of combination of the data operation modules" will be described as shown in FIG. 13, for example. Here, an element <kvm> that represents the Key-Value module is followed by information of the XML module that is provided below this Key-Value module, and then by information of the file system module that is provided below that XML module.

The fourth data operation module is the property module.

The property module 116 is used by the data management system 1 (the resource manager 11) for internal management. In this embodiment, the data management system 1 manages a set of pairs of an attribute name and an attribute value of the property on the associative memory function provided by the Key-Value module 114.

Examples of the operations of the property to be provided by the property module 116 include the following.

(1) FINDPROP: Search a value of a specified attribute name.

(2) ADDPROP: Add a specified pair of an attribute name and an attribute value.

(3) REMPROP: Remove a pair of a specified attribute name and its attribute value.

FIG. 14 shows an example of an XML document in the case where the property module 116 manages pairs of an attribute name and an attribute value of the property as an XML document by using the Key-Value module 114. FIG. 14 is an example for the property of the data "data1".

In FIG. 14, each <key> element indicates an attribute name of the property, and each <value> element indicates an attribute value of the property. Here, there are three attributes including "creationdate" indicating creation date and time of the data, "owner" indicating an owner of the data, and "module" for describing a manner of combination of the data operation modules that is necessary in accessing the entity of this data. The respective <value> elements indicate their attribute values.

Here, the "module" attribute has a role for connecting the property of the data to the entity of the data in the data management system 1 of this embodiment. As will be described below, in the case where the application program 2 accesses the entity of the data having this property by opening it, the resource manager 11 selects and combined the necessary data operation modules according to the information written in this "module" attribute.

Figures 15, 16:
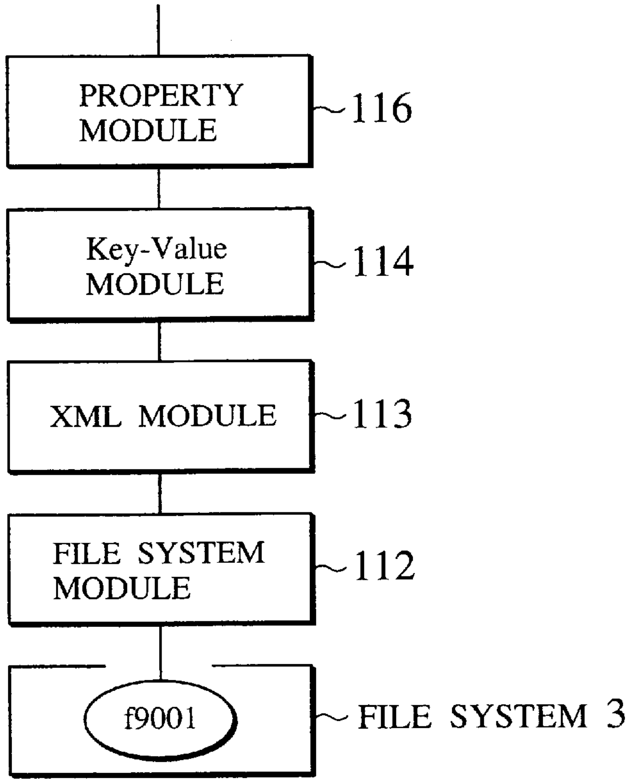
FIG. 15 is a diagram showing an exemplary manner of using a property module in the data management system of FIG. 3 and FIG. 4.
FIG. 16 is a diagram showing an exemplary description describing a manner of using a property module in the data management system of FIG. 3 and FIG. 4.

In the case of accessing data by using the property module 116, usually the property module 116, the Key-Value module 114, the XML module 113 and the file system module 112 are used in combination as shown in FIG. 15.

At this point, "a manner of combination of the data operation modules" will be described as shown in FIG. 16, for example. Here, an element <propm> that represents the property module is followed by information of the Key-Value module that is provided below this property module, and then by information of the XML module that is provided below that Key-Value module, and then by information of the file system module that is provided below that XML module.

The fifth data operation module is the directory module.

The directory module 115 is used by the data management system 1 (the resource manager 11) for internal management, similarly as the property module 116. The data management system 1 is managing the directory as a correspondence between a key given by a directory name or a data name that is existing below that directory and a value given by information on a manner of combination of the data operation modules necessary in accessing its property. In this embodiment, the correspondences are managed on the associative memory function provided by the Key-Value module 114.

Examples of the operations of the directory to be provided by the directory module 115 include the following.

(1) LOOKUP: Look up a property data of a data of a specified name.

(2) MKDIR: Add a new directory as a child.

(3) MKDATA: Add new data as a child.

(4) RMDIR: Remove a directory.

(5) RMDATA: Remove a data.

FIG. 17 shows an example of an XML document in the case where the directory module 115 manages pairs of a directory name or a data name that exists below the directory and information on a manner of combination of the data operation modules necessary in accessing its property, as an XML document by using the Key-Value module 114. FIG. 17 is an example for the entity of the directory "dir2" shown in FIG. 1. In FIG. 17, each <key> element indicates a name of a directory or a data that is a child, each <value> element indicates information on a manner of combination of the data operation modules necessary in accessing its property. Here, two data "data1" and "data2" are managed as children.

In the case where the application program 2 requests an access to data "data1", the resource manager 11 first searches <value> of the entry having "data1" as <key> from the entity of the directory "dir2" shown in FIG. 17, and selects and combines the data operation modules for accessing data of the property of "data1" according to the description written in that <value>. As a result, the property module 116 that manages information as shown in FIG. 14 is created so that this is recorded in the name management table 22, while a value of the "module" attribute is extracted from data of the property, and the data operation modules necessary in accessing data of the XML document corresponding to the entity of "data1" are selected and combined using the extracted value of the "module" attribute. A pointer of the XML module 113 that is created as a result of this is then given to the application program 2.

Figures 18, 19:
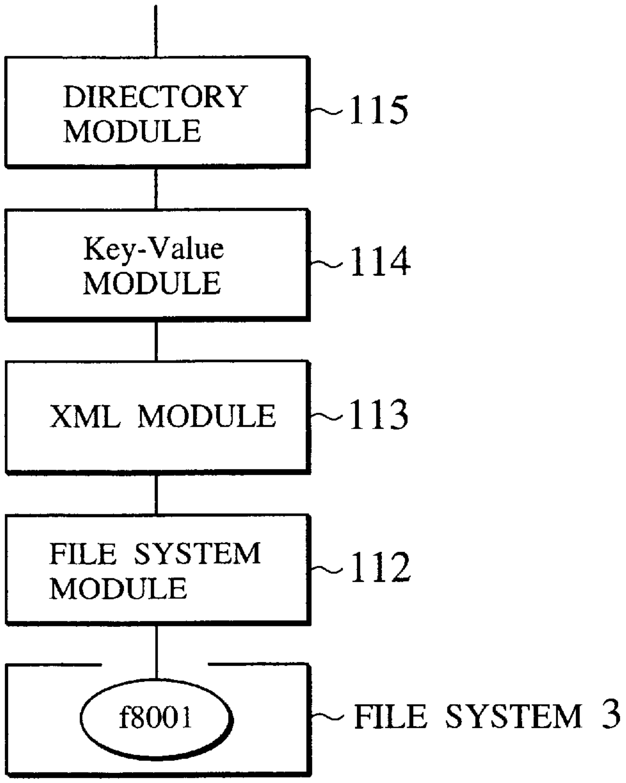
FIG. 18 is a diagram showing an exemplary manner of using a directory module in the data management system of FIG. 3 and FIG. 4.
FIG. 19 is a diagram showing an exemplary description describing a manner of using a directory module in the data management system of FIG. 3 and FIG. 4.

In the case of accessing data by using the directory module. 115, usually the directory module 115, the Key-Value module 114, the XML module 113 and the file system module 112 are used in combination as shown in FIG. 18.

At this point, "a manner of combination of the data operation modules" will be described as shown in FIG. 19, for example. Here, an element <dirm> that represents the directory module is followed by information of the Key- Value module that is provided below this directory module, and then by information of the XML module that is provided below that Key-Value module, and then by information of the file system module that is provided below that XML module.

As already mentioned above, the resource manager 11 selects and combines the data operation modules necessary in accessing data specified by the description recorded in data of the property or the directory. This operation will now be described for an exemplary case shown in FIG. 20. Here, the specific examples shown in FIG. 1 and FIG. 14 will be used.

Figure 20:
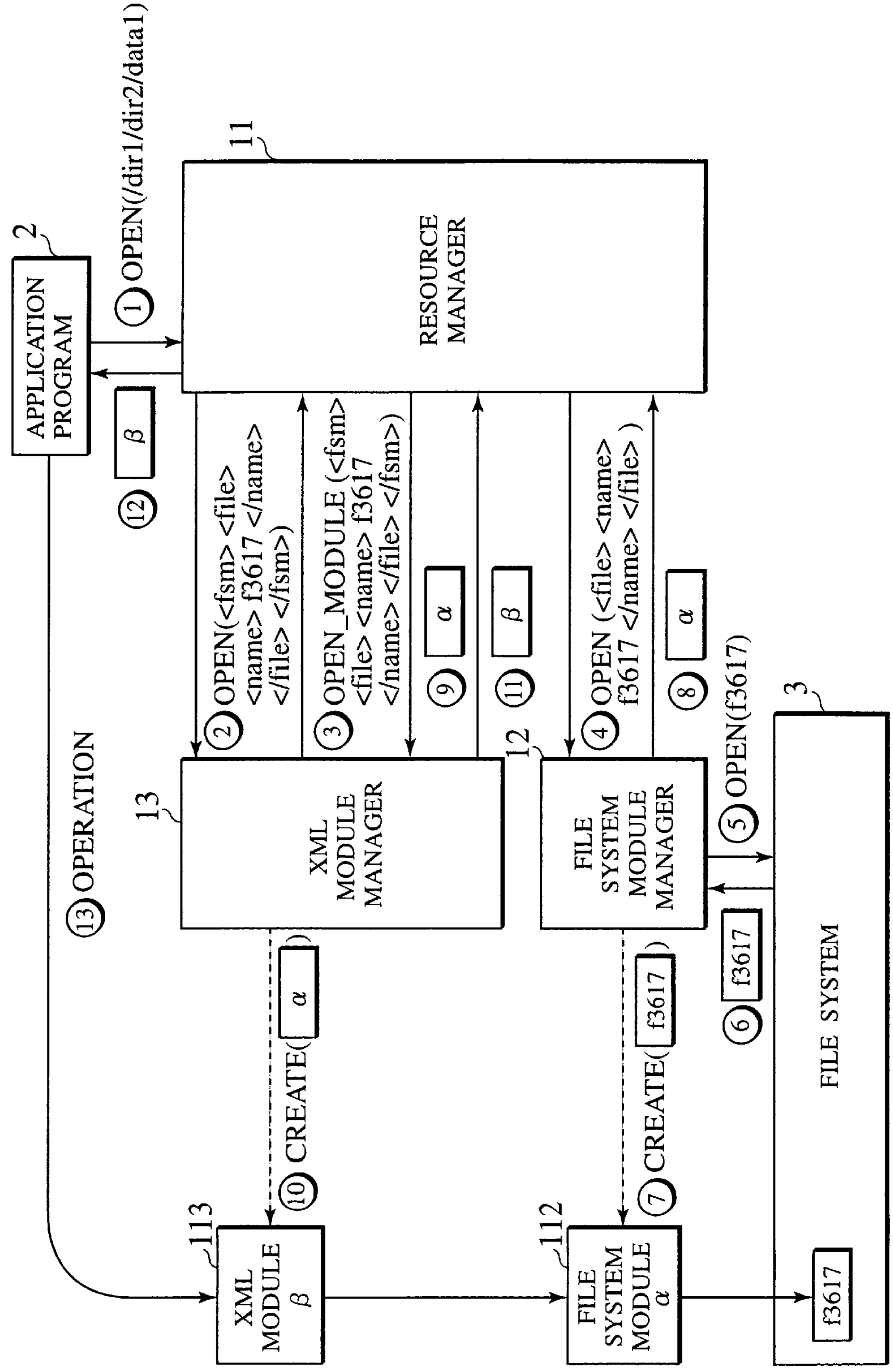
FIG. 20 is a schematic diagram showing an exemplary flow of data open processing in the data management system of FIG. 3 and FIG. 4.

FIG. 20 shows the internal operation of the data management system 1 in the case where the application program 2 commanded the resource manager 11 of the data management system 1 to open the data "/dir1/dir2/data1". In the following, the flow of the processing will be described along the numbers indicated in FIG. 20.

(1) The application program 2 commands the data management system 1 to open "/dir1/dir2/data1". This command is received by the resource manager 11.

Here, it is assumed that the property of "/dir1/dir2/data1" is already registered and managed in an accessible state in the name management table 22 by the resource manager 11. If the property of "dir1/dir2/data1" is not accessible yet, it is set in the accessible state by combining the necessary data operation modules using information in the directory "dir2", and registered in the name management table 22.

Upon receiving this command, the resource manager 11 extracts a value of the "module" attribute from the property of "data1". Here, as shown in FIG. 14, this value is given in the following form.

```
<xmlm>
  <fsm>
    <file>
      <name>f3617</name>
    </file>
  </fsm>
</xmlm>
```

(2) Next, the resource manager 11 checks the data operation module manager corresponding to <xmlm>by referring to the data operation module management table 21. In this case, the XML module manager 13 is selected as the corresponding one. Then, the XML module manager 13 is commanded by an OPEN command to create the XML module 113 with the following information.

```
<fsm>
  <file>
    <name>f3617</name>
  </file>
</fsm>
```

(3) The XML module manager 13 that is commanded to create a new XML module 113 by the OPEN command first requests a creation of the data operation module necessary in accessing binary data for its own use, to the resource manager 11 by using OPEN_MODULE. At this point, the following information on the data operation module to be created is also given.

```
<fsm>
  <file>
    <name>f3617</name>
  </file>
</fsm>
```

(4) The resource manager 11 checks the data operation module manager corresponding to <fsm> which is the uppermost element in the argument of OPEN_MODULE, using the data operation module management table 21. Here, it is the file system module manager 12 so that the file system module manager 12 is selected. Then, the file system module manager 12 is command by an OPEN command to create a file system module 112 with the following information.

```
<file>
  <name>f3617</name>
</file>
```

(5) The file system module manager 12 ascertains that the file name is f3617 from information regarding the file that is given by the argument of OPEN, and commands the file system 3 to open this file.

(6) The file system 3 opens the specified f3617, and returns its handle to the file system module manager 12 that is a source of a call.

(7) The file system module manager 12 creates a file system module 112 that uses the handle of the file f3617 in the file system 3. Here, the created file system module will be referred to as "$\alpha$".

(8) The file system module manager 12 returns the handle of the created file system module a to the resource manager 11 that is a source of a call.

(9). The resource manager 11 returns the handle of the file system module a to the XML module manager 113 that is a source of a call for OPEN_MODULE.

(10) The XML module manager 13 creates the XML module 113 for realizing the structure of the XML document on the binary data managed by the file system module a. Here, the created XML module will be referred to as "$\beta$".

(11) The XML module manager 13 returns the handle of the XML module $\beta$ to the resource manager 11 which is a source of a call for OPEN.

(12) The resource manager 11 returns the handle of the XML module $\beta$ to the application program 2 which is a source of a call for OPEN.

(13) The application program 2 hereafter carries out the processing while commanding operations of the XML document to the XML module $\beta$.

Now, up to this point, the operation in the case where a manner of combination of the data operation modules for accessing a given data is written in the property or the directory has been described. However, in the case of creating data initially, it is necessary to determine a manner of combination of the data operation modules somehow.

In the following, a procedure for determining a manner of combination of the necessary data operation modules from a category of data to be created by using rules will be described as an exemplary procedure to be carried out in such a case.

Here, the category of data is a name indicating a type of data, and in this embodiment, it is assumed that the following category names are available.

| | |
|---|---|
| <property/> | : a category name of properties |
| <directory/> | : a category name of directories |
| <association/> | : a category name of associative memories |
| <document/> | : a category name of XML documents |
| <binary/> | : a category name of binary data |
| <file/> | : a category name of files |

A correspondence between the category and the data operation module that can actually operate data of that category is managed as a rule. FIG. 21 shows an example of such rules. As shown in FIG. 21, the rule describes data of which category can be realized by which data operation module. The rule that begins with <rule> contains a category description section that begins with <category>and a data operation module description section that begins with <expand>.

For example, in the example of FIG. 21, the first rule specifies that the property module (116) indicated by <propm/> should be used in order to operate data of the property category <property/>. Similarly, the directory module (115) indicated by <dirm/> should be used for data of the directory category <directory/>, the XML module (113) indicated by <xmlm/> should be used for data of the XML document category <document/>, and so on. At least one rule is managed for each category in this manner.

By using a scheme for determining the correspondence between the category and the data operation module according to the rules, it is possible to change the data operation module to be used, even in the cases of creating data of the same category, by changing the rule.

Note that the rule for <file/> category is used for describing parameters regarding the file system 3. In the example of FIG. 21, the data operation module description section of the rule corresponding to <file/> category merely describes <file/> so that no special information is provided in this case.

Also, when the file system 3 has a plurality of partitions, for example, it is possible to provide an element <partition/> below <file/> that corresponds to <file/> category as shown in FIG. 22, such that a file is created in the first partition if its value is "1". If this rule is encountered when the file system module 112 attempts to create data of <file/> category, i.e., a file, the file is created in the first partition. If this rule is absent, the file system 3 will create the file in a default partition.

Next, with reference to FIG. 23, a procedure for creating a new data in the data management system of this embodiment will be described. Here, it is assumed that the rules as shown in FIG. 21 are given in advance. How these rules are actually given will be described later.

Figure 23:
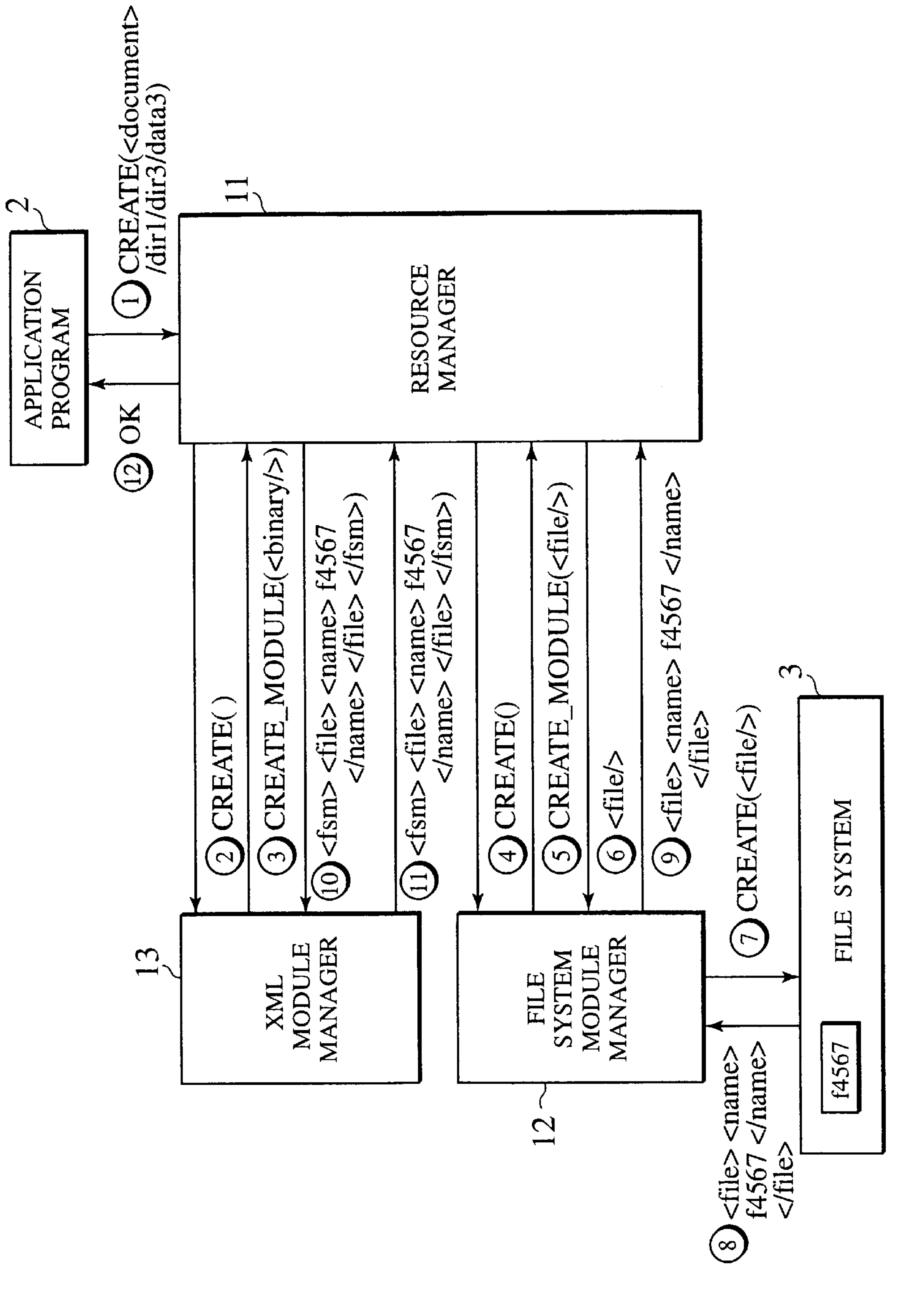
FIG. 23 is a schematic diagram showing an exemplary flow of data creation processing in the data management system of FIG. 3 and FIG. 4.

FIG. 23 shows an exemplary operation in the case where the application program 2 commanded the data management system 1 by a CREATE command to create data of the XML document type with a name "/dir1/dir3/data3". In the following, the flow of the processing will be described along the numbers indicated in FIG. 23.

(1) The application program 2 commands the data management system 1 by the CREATE command to create data of <document/> category with a name "/dir1/dir3/data3". This command is received by the resource manager 11.

Here, it is assumed that the property of "/dir1/dir3/data3" is already registered and managed in an accessible state in the name management table 22 by the resource manager 11. If the property of "dir1/dir3/data3" is not accessible yet, it is set in the accessible state by combining the necessary data operation modules using information in the directory "dir3", and registered in the name management table 22.

(2) Upon receiving this command, the resource manager 11 searches out a rule from the category name <document/>, and ascertains that this can be realized by the XML module. Consequently, the resource manager 11 commands the XML module manager 13 by a CREATE command to newly create an entity of data.

(3) The XML module manager 13 needs binary data for its own use so that the XML module manager 13 requests the resource manager 11 by a CREATE_MODULE command to create data of <binary/> category.

(4) The resource manager 11 searches out a rule, corresponding to <binary/> category, and ascertain that this can be realized by the file system module. Consequently, the resource manager 11 commands the file system module manager 12 by a CREATE command to newly create an entity of data.

(5) The file system module manager 12 needs information for the purpose of requesting a creation of a file to the file system 3 for its own use, so that the file system module manager 12 requests the resource manager 11 by a CREATE_MODULE command to search information regarding data of <file/> category.

(6) The resource manager 11 searches out a rule corresponding to <file/> category, and returns a value (which is <file/> here) of its <expand/> section to the file system module manager 12 which is a source of a call. Here, the operation in the case of <file/> category is different from the operation in the case of <document/> category or <binary/> category described above.

(7) The file system module manager 12 commands the file system 3 to create a new file, by using the information received from the resource manager 11.

(8) The file system 3 creates a new file and returns information on its name, etc., to the file system module manager 12.

(9) The file system module manager 12 returns information of a newly created file which will be necessary in opening this data hereafter.

(10) The resource manager 11 adds an element <fsm/> for identifying the file system module which is the data operation module for handling the information returned from the file system module manager 12, to the information returned from the file system module manager 12, and returns the resulting information to the XML module manager 13 that issued the CREATE_MODULE command.

(11) The XML module manager 13 receives the description of the data operation modules necessary in accessing the binary data for its own use from the resource manager 11, and returns it as a result of CREATE.

(12) The resource manager adds an element <xmlm/> for identifying the XML module which is the data operation module for handling the information returned from the XML module manager 13, to the information returned from the XML module manager 13. This describes a manner of combination of the data operation modules necessary for accessing an entity of data "/dir1/dir3/data3", so that this is recorded as a value of the "module" attribute of the property. This completes the processing so that the operation returns to the application program 2.

By the procedure up to this point, the information on a manner of combination of the data operation modules necessary in accessing data to be newly created is recorded in the property. However, the actual access to the data cannot be made at this stage yet, so that usually the above described open processing for the data is carried out next to actually access the data.

Note that the above description is directed to an exemplary case where a manner of combination of the data operation modules necessary for accessing data is determined by the CREATE operation provided by the data management system 1, and the data is set in the accessible state by actually combining the data operation modules by the OPEN operation provided by the data management system 1 according to the result of the determination, but it is of course also easily possible to processing the CREATE operation and the OPEN operation simultaneously.

Figures 24, 25:
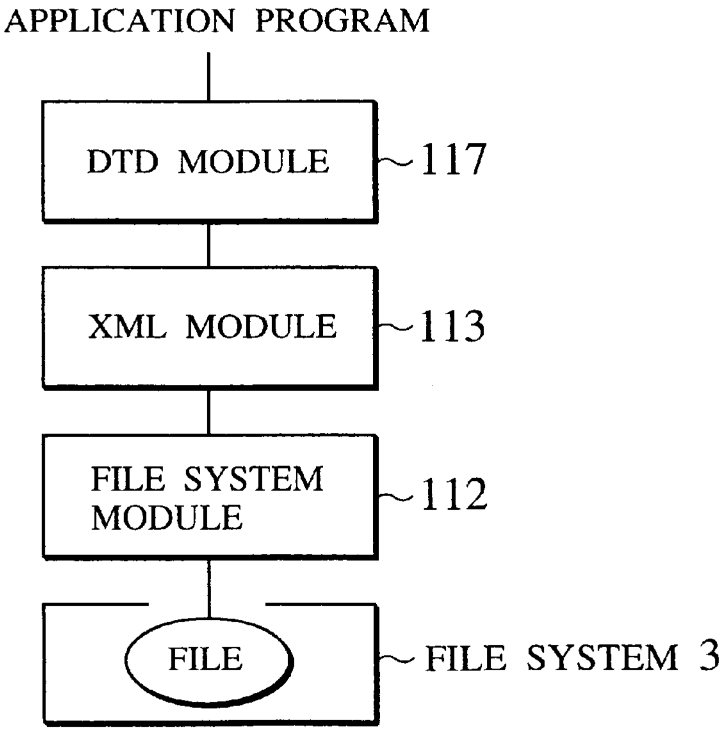
FIG. 24 is a diagram showing an exemplary rule having a context that can be used in the data management system of FIG. 3 and FIG. 4.
FIG. 25 is a diagram showing an exemplary manner of using a rule having a context in the data management system of FIG. 3 and FIG. 4.

Now, it is possible to describe a context in the rules for searching the data operation modules from the category of data as in an example shown in FIG. 24.

In FIG. 24, a portion enclosed by <context/> is the context. In the context, it is possible to specify a logical expression obtained by combining the category name such as <document/> and the data operation module name such as <xmlm/> using logical computation operators such as <and/>, <or/> and <not/>.

The rule that has the context indicates that the data operation module in the <expand> section is to be used in the case where not only the category is the same but also a position at which the data operation module corresponding to that category will be used (a position or an order of a combination of the data operation modules in the hierarhical structure, for example) is a correct position specified by the context. For example, the example shown in FIG. 24 indicates that the data operation module indicated by <dtdm/> is to be used only in the case where the category is <document/> and the data operation module indicated by <dtdm/>does not exist in upper levels.

Here, the data operation module indicated by <dtdm/> is a DTD module 117 which is data operation module for monitoring whether a structure given by DTD (a definition of a structure of an XML document) is satisfied or not with respect to XML documents. The lower level modules used by <dtdm/> are those that can operate data of the XML document category, and <dtdm/> itself behaves as if it is the data operation module that operates on data of the XML document category when viewed from the user.

When the rule of FIG. 24 is combined with the rules of FIG. 21 such that the rules are searched in this order, as shown in FIG. 25, the data operation modules will be combined such that the XML module 113 is placed over the file system module 112, and the DTD module 117 is placed over that in the case of accessing data of the XML document category.

Note that a DTD module manager will be provided in the case of using the DTD module 117.

Figure 26:
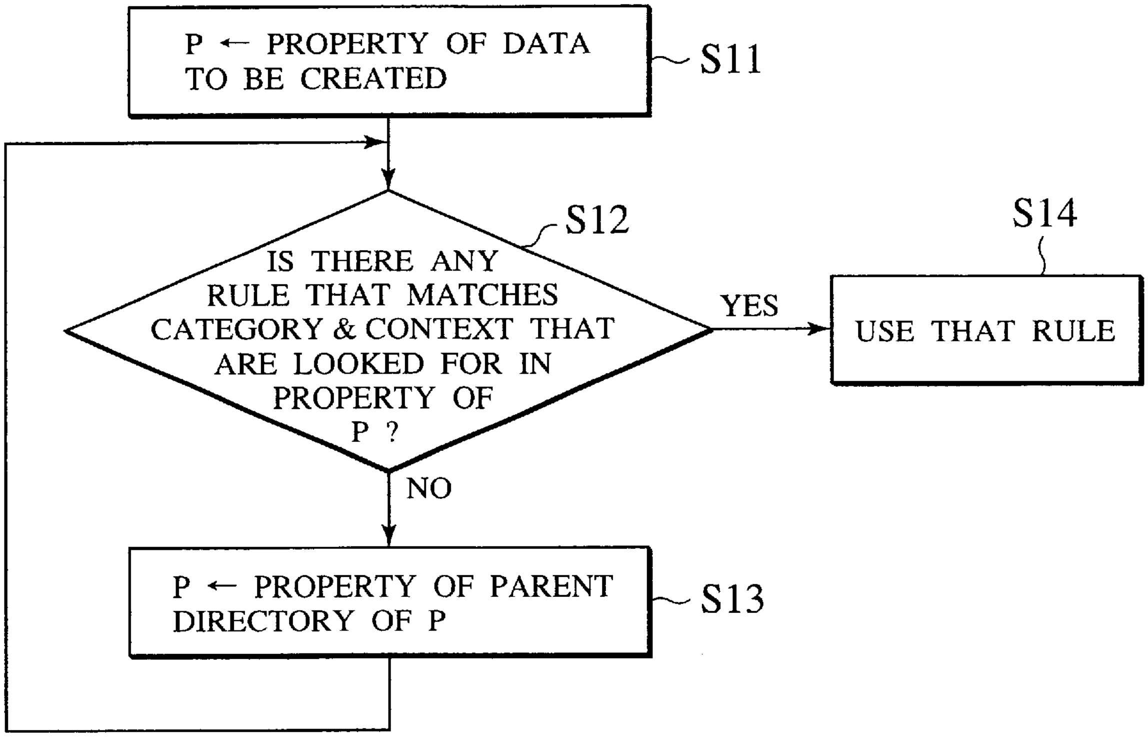
FIG. 26 is a flow chart showing an exemplary procedure for a rule search in the data management system of FIG. 3 and FIG. 4.

The description up to this point assumed that the rules for searching the data operation modules from the category of data are given in advance. In practice, it is possible to apply the rules flexibly by registering these rules in the property of the directory or the data, and searching for a rule that matches with the given category and context by a procedure as shown in FIG. 26.

Namely, at a time of creating an entity of some data, the directories (hierarchical levels of data) are sequentially (according to priority levels defined in accordance with the hierarchical levels of data) traced from that data toward the root (steps S11, S13), and the data operation module is determined by using a rule (a selection method for selecting data operation modules) satisfying the conditions of the category and the context that is found first in the course of tracing (steps S12, S14).

Figures 27A, 27B, 27C:
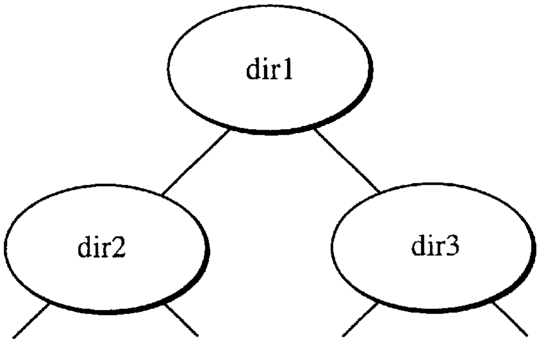
FIGS. 27A, 27B and 27C are diagrams showing one example of a structure of directories and data, and two rules for two directories that can be used in the data management system of FIG. 3 and FIG. 4.

In this way, in the case where "dir2" and "dir3" exist below "dir1" as shown in FIG. 27A for example, if a rule for <file/> that creates a file in a partition No. 0 is provided for "dir1" as shown in FIG. 27B and a rule for <file/> that creates a file in a partition No. 1 is provided for "dir2" as shown in FIG. 27C, it is possible to realize a control such that a file to be created below "dir2" will be created in the partition No. 1 by the default setting while any other file to be created will be created in the partition No. 0 by the default setting.

This also applies similarly to data of the other categories so that it is possible to realize a control such that different data operation modules will be used even for the same XML document, depending on the directories.

For example, suppose that a data with a name "data1" exists below the directory "dir2" and a data with a name "data2" exists below the directory "dir3" as shown in FIG. 28A. In this case, a rule as shown in FIG. 28B is provided for "dir1" and a rule as shown in FIG. 28C is provided for "dir2". Here, <xmls/> is a name of a sequential XML module and <xmlr/> is a name of a random XML module.

The sequential XML module and the random XML module are both a data operation module for storing a tree structure data of XML documents in an expanded form on the binary data provided by the file system module and providing operations with respect to the tree structure data. The operation functions provided by these data operation modules with respect to the application program or the like that uses them are the same as the XML module. However, the sequential XML module uses an internal data structure by which the sequential accesses to XML documents become faster while the random XML module uses a data structure by which random accesses to XML documents become faster.

By providing rules as shown in FIG. 28B and FIG. 28C, it is possible to realize a control such that the random XML module will be used in the case of creating an XML document below "dir2" while the sequential XML module will be used in the case of creating an XML document below "dir1" (including the case of creating an XML document below "dir3" but excluding the case of creating an XML document below "dir2").

In this example, suppose that "data1" and "data2" are both data that are created as XML documents. Then, the module hierarchical structure for "data1" that exists below "dir2" becomes as shown in FIG. 28D, for example, whereas the module hierarchical structure for "data2" that exists below "dir3" becomes as shown in FIG. 28E, for example.

Similarly as in this example, it is possible to provide two or more different data operation modules on the same hierarchical level (the sequential XML module 1132 and the random XML module 1131 in the above example) from which one that will be used can be selected. The selection rule can be set such that different data operation modules are selected for different directories, or alternatively such that different data operation modules are selected for different conditions in the <context/> section of the rules.

Note that it is preferable to provide a default rule that matches with all categories in the root directory, because if no such rule is provided, there could be cases where it becomes impossible to find the necessary data operation module cannot.

In the examples described up to this point, a manner of combination of the data operation modules necessary in accessing data is a simple stacking of the data operation modules. However, in the data management system of this embodiment, it is also possible to use a data operation module that is designed to be used in combination with other data operation modules.

Figure 29:
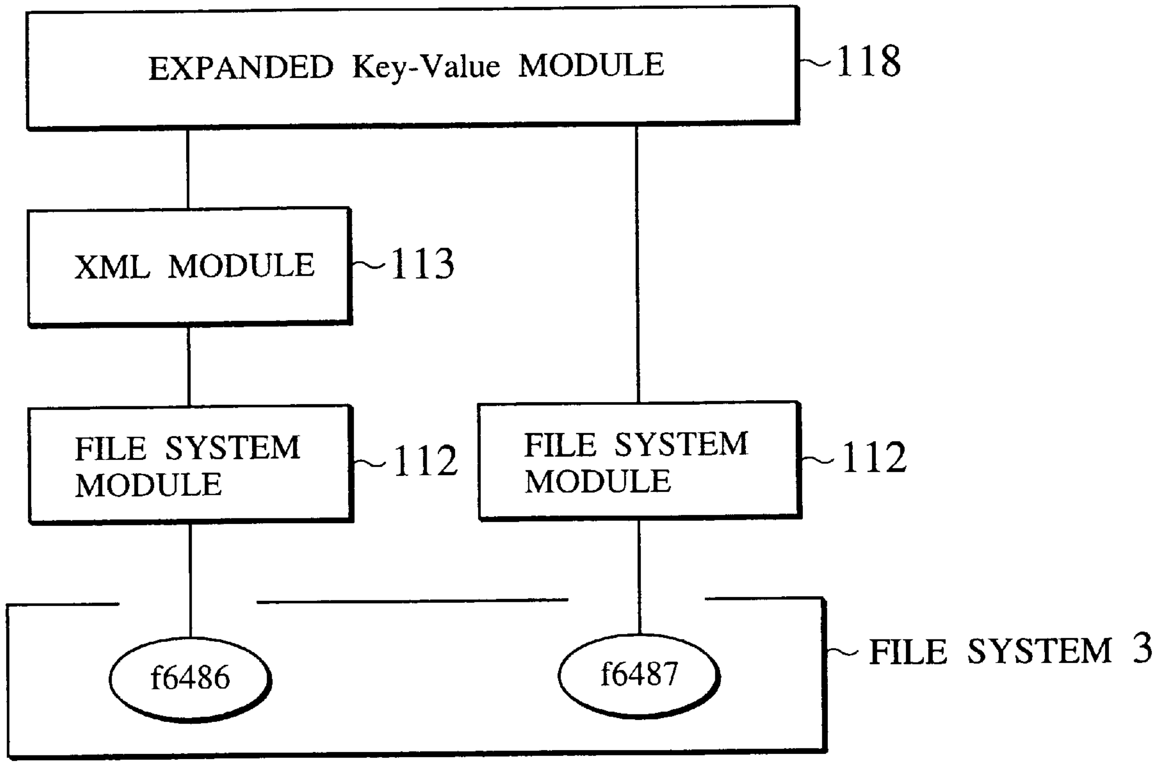
FIG. 29 is a diagram showing an exemplary manner of using an expanded Key-Value module in the data management system of FIG. 3 and FIG. 4.

FIG. 29 shows an example of such a data operation module.

Here, an expanded Key-Value module that can be used in place of the Key-Value module as the data operation module of <association/> category is shown as an example. The expanded Key-Value module 118 is similar to the Key-Value module in that it has correspondences between a key and a value as XML documents, but differs in that it also has an index in a form of binary data such that the fast search is possible using this index.

For such an expanded Key-Value module 118, a manner of combination of the data operation modules will be described in a format shown in FIG. 30. Here, <kva/> is a name indicating the expanded Key-Value module 118. In the above described examples, a description of the lower level data operation modules to be used by that data operation module is placed below the name of the data operation module, but here information <kvainfo/> specific to <kva/> is provided. In <kvainfo/>, there are two elements <data/> and <index/>, where <data/> records a manner of combination of the data operation modules necessary for accessing the XML document recording a key and a value, while <index/> records a manner of combination of the data operation modules necessary for accessing the binary data recording the index.

Note that an expanded Key-Value module manager will be provided in the case of using the expanded Key-Value module 118.

Also, the case of using a general file system as a data storage system has been described above, but it is also possible to apply the present invention to a data storage system that outputs data in the other data model such as XML data. In the case of using XML data as the data model to be handled by the data storage system, the hierarchical levels of the file system module and the XML module can be omitted and new XML modules for applying the XML data handled by the data storage system to this data management system can be provided according to the need, in the configuration of FIG. 4, for example.

Also, in the above, the data operation modules that should be selected and the order in which they should be used are specified in the data management system 1, but it is also possible for the application program 2 to specify a manner of combination of the data operation modules, and it is possible to use both of these schemes together.

In the case of specifying a manner of combination of the data operation modules from the application program 2, it is possible to use a method in which an information for specifying the data operation modules that should be selected and the order in which operations should be applied to data (such as information of FIG. 14, for example) is notified from the data management system 1 to the application program 2, and the application program 2 notifies a manner of combination of the data operation modules to the data management system 1 according to this information.

Alternatively, it is possible to use a method in which the application program 2 acquires by its independent operation an information for specifying the data operation modules that should be selected and the order in which operations should be applied to data (such as information of FIG. 14, for example), and the application program 2 notifies a manner of combination of the data operation modules to the data management system 1 according to this information.

For example, in the example of FIG. 20, when the application program 2 commands the data management system 1 to open "/dir1/dir2/data1" in (1), instead of using a command in a form of OPEN. (/dir1/dir2/data1), this will be commanded using a command in the following form.

```
Open (<xmlm>
  <fsm>
    <file>
      <name>f3617</name>
    </file>
  </fsm>
</xmlm>)
```

As described, according to the present invention, a plurality of data operation modules having different operation functions are provided for the purpose of operating data, and when a request for a processing with respect to a desired data is received from the application program, the operations are applied to this data by selecting the data operation modules that should carry out the operations with respect to that data such that this data will be in compliance with the data model (a data structure that can be interpreted by the application program, data with attached functions that can be used by the application program, etc.) suitable for the processing that the application program wishes to carry out, so that it is possible to provide a data management system and a data management method capable of realizing improved flexibility, independency and expandability together.

According to the present invention, the data management and operation using arbitrary data model (such as XML document or associative memory in the case where the data storage system is the file system, for example) become possible by combining the necessary data operation modules on some data model provided by some data storage system (a general file system for outputting binary data such as a system for outputting data exactly as read out from the hard disk, a special file system with an additional function for outputting data after converting the binary data into XML data for example, etc.), e.g., on the binary data provided by the file system, so that the flexible data management function can be provided.

Also, according to the present invention, the application programs and the data operation modules are separated so that there is an advantage that there is no need to describe a processing necessary for the data operation in the application program, unlike the case of using the conventional file system. For this reason, even in the case of sharing data by a plurality of application programs, the sharing can be realized easily because the processing necessary for the data operation is provided by the data operation modules. Moreover, it is possible to expand the function or exchange the data operation modules, without making any change in the application program. In other words, it is possible to realize a high data independency.

Also, according to the present invention, it is possible to provide the data management function with an improved expandability that enables the addition of a data operation module with a new function, the upgrading of the function of the existing data operation module independently from the application program, and the addition of variations for providing the data operation modules with a variety of characteristics even among the data operation modules for handling data of the same category.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the data management system of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data management system for applying operations on data outputted from a data storage system and providing data to a processing of an application program, the data management system comprising:

a memory unit configured to store a plurality of data operation modules for operating data which have different operation functions; and an operation unit configured to read out requested data requested by the application program from the data storage system, select those data operation modules that should carry out the operations with respect to the requested data such that the requested data will be in compliance with a data model indicating a type of data which is suitable for the processing to be carried out by the application program, from the plurality of data operation modules, such that the requested data to which the operations are applied by selected data operation modules are given to the application program.

2. The data management system of claim 1, wherein when the operation unit selects two or more data operation modules, one data operation module corresponding to a lowermost hierarchical level among the selected data operation modules operates the requested data outputted from the data storage system and gives the requested data to a data operation module corresponding to an upper hierarchical level of said one data operation module, and another data operation module corresponding to an uppermost hierarchical level among the selected data operation modules operates the requested data given from a data operation module corresponding to a lower hierarchical level of said another data operation module and gives the requested data to the application program.

3. The data management system of claim 1, wherein when the memory unit stores two or more data operation modules corresponding to an identical hierarchical level, the operation unit takes one of said two or more data operation modules as a candidate at a time of selecting the data operation modules that should carry out the operations with respect to the requested data.

4. The data management system of claim 1, wherein the operation unit also records an information for specifying the data operation modules that should be selected and an order in which the operations should be applied to the requested data at a time of giving the requested data to the application program, in relation to the requested data stored in the data storage system, such that the operation unit is operated according to said information recorded in relation to the requested data read out from the data storage system.

5. The data management system of claim 1, wherein the operation unit also determines the selected data operation modules that are necessary for the operations of the requested data in a specified category and a manner of combination of the selected data operation modules according to rules for determining a manner of combination of necessary data operation modules from a category of data that are provided in advance, when a category of the requested data is specified.

6. The data management system of claim 1, wherein the operation unit selects those data operation modules that should carry out the operations with respect to a new data created by the application program in order to store the new data into the data storage system in accordance with the data model, from the plurality of data operation modules, and writes the new data to which the operations are applied by selected data operation modules into the data storage system.

7. The data management system of claim 1, wherein when the application program creates a new data, the operation unit selects at least one of data operation modules that should be used by the operation unit according to a category of the new data specified from the application program, and said at least one of data operation modules selects other data operation modules or a category that can specify the other data operation modules.

8. The data management system of claim 1, further comprising:

a management unit configured to manage a plurality of data in the data storage system hierarchically;

wherein the operation unit uses a selection method determined according to a priority level defined in accordance with a hierarchical level of the requested data from selection methods stored in relation to the hierarchical level of the data, at a time of selecting those data operation modules that should carry out the operations with respect to the data.

9. A data management method in a data management system for applying operations on data outputted from a data storage system and providing data to a processing of an application program, the data management method comprising the steps of:

reading out requested data requested by the application program from the data storage system upon receiving a request for processing with respect to a desired data stored in the data storage system from the application program;

selecting those data operation modules that should carry out the operations with respect to the data such that the requested data will be in compliance with a data model indicating a type of data which is suitable for the processing to be carried out by the application program wishes to carry out, from a plurality of data operation modules for operating data which have different operation functions, that are provided in advance; and applying the operations to the requested data by selected data operation modules and giving the selected data to which the operations are applied by the selected data operation modules to the application program.

10. The data management method of claim 9, further comprising the steps of:

applying the operations by the selected data operation modules with respect to a new data created by the application program, in order to store the new data into the data storage system in accordance with the data model; and writing the new data to which the operations are applied by the selected data operation modules into the data storage system.

11. A computer usable medium having computer readable program codes embodied therein for causing a computer to function as a data management system for applying operations on data outputted from a data storage system and providing data to a processing of an application program, the computer readable program codes include:

a first computer readable program code for causing said computer to read out requested data requested by the application program from the data storage system upon receiving a request for processing with respect to a desired data stored in the data storage system from the application program;

a second computer readable program code for causing said computer to select those data operation modules that should carry out the operations with respect to the requested data such that the requested data will be in compliance with a data model indicating a type of data which is suitable for the processing to be carried out by the application program from a plurality of data operation modules for operating data which have different operation functions, that are provided in advance; and a third computer readable program code for causing said computer to apply the operations to the requested data by selected data operation modules and giving the requested data to which the operations are applied by the selected data operation modules to the application program.

* * * * *